United States Patent [19]

Molock et al.

[11] Patent Number: 5,292,350
[45] Date of Patent: Mar. 8, 1994

[54] METHOD FOR PREPARING TINTED CONTACT LENS

[75] Inventors: Frank F. Molock; James D. Ford, both of Orange Park; John C. Heaton; Edmund C. Rastrelli, both of Atlantic Beach; Gregory A. Hill, Jacksonville, all of Fla.

[73] Assignee: Vistakon, Inc., Jacksonville, Fla.

[21] Appl. No.: 873,316

[22] Filed: Apr. 24, 1992

[51] Int. Cl.$^5$ ............................ G02C 7/04; D06P 5/00
[52] U.S. Cl. ............................................ 8/507; 8/509; 351/160 H; 351/162
[58] Field of Search .............. 8/507, 509; 352/160 H, 352/162

[56] References Cited

U.S. PATENT DOCUMENTS

| | | | |
|---|---|---|---|
| 4,157,892 | 6/1979 | Tanaka et al. | 8/14 |
| 4,252,421 | 2/1981 | Foley | 351/162 |
| 4,468,229 | 8/1984 | Su | 8/549 |
| 4,559,059 | 12/1985 | Su | 8/507 |
| 4,639,105 | 1/1987 | Neefe | 351/162 |
| 4,640,805 | 2/1987 | Neefe | 264/2.1 |
| 4,680,336 | 7/1987 | Larsen et al. | 524/548 |
| 4,891,046 | 1/1990 | Wittmann et al. | 8/507 |
| 5,059,018 | 10/1991 | Kanome et al. | 351/162 |
| 5,151,106 | 9/1992 | Bhaumik et al. | 8/507 |

FOREIGN PATENT DOCUMENTS 0396376 11/1990 European Pat. Off. ...... C09B 69/10
WO92/11407 7/1992 PCT Int'l Appl. .

Primary Examiner—Linda Skaling
Assistant Examiner—Caroline L. Dusheck
Attorney, Agent, or Firm—Charles J. Metz; Matthew S. Goodwin

[57] ABSTRACT

An improved method is disclosed of imparting a tint or color to a soft, hydrogel contact lens by uniformly dispersing a dye throughout the lens. The dye is composed of a water-soluble compound essentially free of ethylenic unsaturation. A homogeneous solution of the dye in a hydrophilic monomer is prepared, the solution is subjected to polymerization conditions to yield a hydrophilic polymer from which the lens is formed, and the dye dispersed within the polymer is bonded to the polymer by contact with aqueous base prior to final hydration.

The finished lens does not require soaking in an aqueous solution of the dye to impart the desired tint or color to the lens. Additionally, the dye uniformly dispersed throughout the lens according to the improved method does not leach out of the lens or migrate within the lens.

14 Claims, No Drawings

METHOD FOR PREPARING TINTED CONTACT LENS

BACKGROUND OF THE INVENTION

This invention relates to a method for imparting color to a contact lens. More specifically, it relates to an improved method for uniformly dispersing a dye throughout a soft, hydrogel contact lens.

The conventional method for imparting an evenly dispersed tint in a soft contact lens is described, for example, in U.S. Pat. No. 4,468,229. Generally, the lens is first soaked in an aqueous solution of the dye, and then the dye is bonded to the lens in a separate solution. The lens is typically composed of a hydrophilic polymer derived from the polymerization of hydrophilic monomers. The bonding of the dye to the lens is carried out by contacting the soaked lens with an aqueous base prior to the final hydration step, which is intended to provide the soft, hydrogel lens with the desired amount of water at an acceptable pH.

The dyes which are used in the conventional method are typically derived from a halotriazine such as a dihalotriazine or monohalotriazine, especially water-soluble dichlorotriazines. Dichlorotriazine or monohalotriazine dyes that carry sulfonate functionalities, for example, are soluble in water, so it is necessary that bonding occur with the hydrophilic polymer from which the lens is composed before the final hydration step. Otherwise, the dye could migrate within the lens to create an uneven dispersion, or leach out from the lens into the eye of the wearer.

The dye which imparts the tint to a soft lens made using the conventional method not only is dispersed in the lens, but also does not migrate within the lens or leach out of the lens after the bond has formed. The tinted lens is also stable in an aqueous medium and after repeated high temperature cycling, conditions which are present during routine wear and cleaning. The conventional method requires that the lens be soaked in a solution containing the dye which is at a specific concentration of the dye and at a specific conductivity so that the dye diffuses into the polymer. The conductivity is important since one may control the swelling of a lens by selecting various salt concentrations. It is also important that the dye concentration and time the lens stays in the dye soak be precisely controlled since the diffusion kinetics controls the intensity of the tinted contact lens. The conventional method always needs to have a high concentration of dye in the dye wash so that the continuous tinting can be managed. Unfortunately, the conventional method is cumbersome and requires multiple steps, especially at commercial scale production, because it is necessary to soak the lens in a solution of the dye at a specific concentration and time to create a dispersion of the dye in the lens. Therefore, because of this difficulty, alternative methods have been sought.

U.S. Pat. No. 4,157,892 discloses adding a functionality to the polymer from which the lens is derived which is reactive with the dye. The functionalized polymer is prepared by reacting a "coupler monomer" with a conventional hydrophilic monomer. This coupler monomer has a high probability of changing the physical properties of the polymer. The lens prepared from the functionalized polymer is immersed in a solution of a diazonium dye, where the dye then bonds to the polymer. Although adequate bonding occurs, this method still requires immersion of the finished lens in a solution of the dye.

Another interesting method for imparting color to a soft lens is disclosed in U.S. Pat. No. 4,640,805. This patent describes preparing a tinted lens using a conventional spin casting technique. A suspension of dye pigment in liquid monomer is applied to the mold surface prior to polymerization of bulk monomer in the spin cast mold. Although this method provides a simple way for imparting color to the surface of the lens, it does require that the mold be stamped or printed with specific geometries and spacing.

Attempts have been made to incorporate the dye in the lens by polymerizing the hydrophilic monomer from which the lens is derived in the presence of the dye. For example, U.S. Pat. No. 4,252,421 discloses polymerizing a hydrophilic monomer in the presence of a water-insoluble dye. The dye is supposed to become entrapped in the finished, hydrated lens because of its incompatibility with water. Unfortunately, the dye will leach out of a lens derived from polymerizing the most commonly used hydrophilic monomer, hydroxyethylmethacrylate (HEMA), when the lens is fully hydrated to greater than about 40 weight percent water.

Both U.S. Pat. No. 4,252,421 and European Patent Application 0 396 376 disclose the use of a dye which is functionalized with a polymerizable group to facilitate bonding of the UV-active monomeric dye during polymerization of the hydrophilic monomer. Although this technique may ensure adequate dye bonding if the reaction between monomer and dye is essentially complete, it requires the step of functionalizing the dye prior to polymerization. Additionally, the dye might alter physical properties if it slows kinetics.

Finally, another attempt to impart color to a contact lens is disclosed in U.S. Pat. No. 4,639,105. This patent discloses spin casting a mixture of liquid monomer, soluble dye and pigment particles to prepare a lens with variations in color achieved by migration of the pigment particles during spin casting. Although this patent indicates that the dyes do not migrate, no mention of what specific dyes are used, and it is believed that such dyes will indeed migrate or leach during wear unless the dye used is functionalized with polymerizable groups as described above. Furthermore, such a lens is unsuitable for those applications where a uniform dispersion of dye or colorant is necessary or desired.

In view of the deficiencies of the prior art, a method of uniformly dispersing a water-soluble dye throughout a soft contact lens, without requiring the step of immersing the finished lens in a solution of the dye or functionalizing the dye before use, is needed. Additionally, such a method would be extremely desirable if it could be used to prepare a tinted contact lens with physical and optical properties which substantially equal those of a conventional untinted lens.

SUMMARY OF THE INVENTION

The invention is an improved method for preparing a soft, hydrogel contact lens which has a dye dispersed substantially uniformly throughout the lens. The invention is an improvement of the conventional method of preparing such a lens, in which the lens is derived from the polymerization of a hydrophilic monomer, the lens is dyed with a coloringly effective amount of a dye composed of a water-soluble compound essentially free of ethylenic unsaturation, and the lens is contacted with an aqueous base to bond the dye to the lens prior to final hydration of the lens. The improvement comprises polymerizing the hydrophilic monomer in the presence of a homogeneous solution of the dye in the monomer.

The improved method of this invention eliminates the need to immerse the lens in an aqueous solution of the dye after polymerization of the hydrophilic monomer from which the finished lens is derived. Additionally, it is unnecessary to functionalize the water-soluble dye with polymerizable, ethylenically unsaturated groups to induce bonding of the dye to the polymer.

The dye is uniformly dispersed throughout the lens, and it does not leach out of the lens into the eye of the wearer or migrate within the lens to create an uneven dispersion of the dye in the lens. In addition, the amount of dye necessary to achieve the desired degree of tinting of the lens is significantly less than the amount necessary when the finished lens is soaked in a solution of the dye according to conventional methods.

Furthermore, the intensity of the tint in the lens can be controlled accurately depending on the concentration of the dye in the hydrophilic monomer. This contrasts with the conventional method, which requires precise control of not only the concentration of the dye in the aqueous soaking solution, but also the soaking time for the lens in the aqueous solution. It should also be noted that the initial basic hydration solution contains a very small amount of the dye which is undiscernable with the naked eye. This can be managed very effectively with inorganic salts since the increase in conductivity keeps the polymerized material from expanding to any appreciable amount.

The physical and optical properties of the tinted lens are substantially equivalent to the physical and optical properties of a corresponding lens without the incorporation of the dye. For example, handling characteristics, wearer comfort, and lens clarity are not sacrificed when the dye is incorporated into the lens using the improved method of this invention.

DETAILED DESCRIPTION OF THE INVENTION

The water-soluble dye is a compound which is essentially free of ethylenic, e.g. vinylic, unsaturation. Preferably, the dye compound is completely free of such unsaturation, and therefore does not possess any functionality which is readily polymerizable with the hydrophilic monomer from which the lens is derived.

The preferred class of dyes are dihalotriazine dyes, especially dichlorotriazine dyes. Dichlorotriazine dyes are described, for example, in U.S. Pat. Nos. 4,559,059 and 4,891,046, each of which is incorporated by reference herein. The most preferred dichlorotriazine dye is Color Index Reactive Blue 4. Monochlorotriazine dyes such as Reactive Blue #2 (2-anthracenesulfonic acid, 1-amino-4-[[4-[[4-chloro-6-[[3 (or 4)-sulfophenyl]amino]-1,3,5-triazin-2-yl]amino]-3-sulfophenyl]amino]-9,10-dihydro-9,10-dioxo-) can also be incorporated into the lens material. The water soluble dyes which can be utilized in addition to Color Index Reactive Blue 4 include Procion Blue MRS; Fiber Reactive Brilliant Blue MRS; 2-anthracenesulfonic acid, 1-amino-4-(3-((4,6-dichloro-s-triazin-2-yl)amino)-4-sulfoanilino)-9,10-dihydro-9,10-dioxo, disodium salt; 2-anthracenesulfonic acid, 1-amino-4-(3-((4,6-dichloro-1,3,5-triazin-2-yl)amino)-4-sulfophenyl)amino)-9,10-dihydro-9,10-dioxo-, disodium salt; and 2-anthracenesulfonic acid, 1-amino-4-(3-((4,6-dichloro-s-triazin-2-yl)amino)-4-sulfoanilino)-9,10-dihydro-9,10-dioxo.

The amount of dye added to the hydrophilic monomer is an amount of dye effective to impart the desired degree of tinting or coloring to the lens. This amount can be readily determined empirically, and will depend on the thickness of the periphery of the lens, the components of the reactive monomer mixture, as well as other factors.

Preferably, the improved method of this invention is used to impart a visibility or handling tint to the lens. This is an amount which enables a wearer to visibly notice the lens during handling if temporarily misplaced, but the amount should not be such that the colored periphery of the lens is easily distinguishable from the cornea of the wearer during use. Generally, the amount of dye added to the hydrophilic monomer before polymerization to achieve a desired visibility tint should range from about 0.01 to about 0.50 percent of the weight of the hydrophilic monomer, preferably from about 0.02 to about 0.33 weight percent of the hydrophilic monomer. The most preferred range is from about 0.02 to about 0.08 percent.

As used herein, a soft hydrogel contact lens refers to a gel-like lens derived from a hydrophilic polymer composition which is swollen with a significant amount of water, typically greater than 30 percent and preferably at least 65 percent. A hydrophilic monomer refers to any monomer which, when polymerized, yields a hydrophilic polymer capable of forming a hydrogel when contacted with water. Examples of hydrophilic monomers include hydroxy esters of acrylic or methacrylic acid, N,N dimethylacryamide, (DMA), N-vinyl pyrrolidone (NVP), and styrene sulfonic acid, or other hydrophilic monomers known in the art.

The preferred hydrophilic monomer is an hydroxy ester of acrylic or methacrylic acid. Examples of such hydroxy esters include, but are not limited to, hydroxyethylmethacrylate (HEMA) hydroxyethylacrylate (HEA), glycerylmethacrylate, hydroxypropylmethacrylate, hydroxypropylacrylate and hydroxytrimethyleneacrylate. The most preferred hydroxy ester of acrylic or methacrylic acid is HEMA, which is the monomer most commonly used in the preparation of soft hydrogel contact lenses.

The hydrophilic monomer is preferably copolymerized with comonomers in a monomer reaction mixture to impart specific improvements in chemical and physical properties, depending on the particular application desired. For example, the equilibrium water content of the lens can be increased if methacrylic acid (MAA) is used as a comonomer. Additionally, polyfunctional crosslinking monomers, such as ethylene glycol dimethacrylate (EGDMA) and trimethylolpropane trimethacrylate (TMPTMA), can be used as comonomers in relatively small amounts in the reaction mixture to improve the dimensional stability and other physical properties of the lens. Similarly, other components may be added for specific applications, for example, to impart UV absorbing properties to the lens.

The monomer reaction mixture also includes an initiator, usually from about 0.05 to 1 percent of a free radical initiator which is thermally activated. Typical examples of such initiators include lauroyl peroxide, benzoyl peroxide, isopropyl percarbonate, azobisisobutyronitrile and known redox systems such as the ammonium persulfatesodium metabisulfite combination and the like. Irradiation by ultraviolet light, electron beam or a radioactive source may also be employed to initiate the polymerization reaction, optionally with the addition of a polymerization initiator, e.g. benzoin and its ethers.

The polymerization of the monomer reaction mixture is carried out after the mixture is contacted with the required amount of the dye, and a homogeneous solution of the dye in the mixture is formed. The amount of time required to form the homogeneous solution can be readily determined empirically.

The polymerization can be carried out in the presence or absence of an inert diluent. If the polymerization is carried out in the absence of a diluent the resulting polymeric composition can be formed, as for example by lathe cutting, into the desired lens shape. Alternatively, and more preferably, the polymerization is carried out in the presence of a suitable inert diluent, for example, the diluents described in U.S. Pat. No. 4,680,336. The preferred inert diluent is a water-displaceable boric acid ester. The characteristics of desired boric acid esters as well as the preferred concentration of ester in the polymerization reaction mixture is described in detail in U.S. Pat. No. 4,495,313, which is incorporated by reference herein. The preferred methods for forming the desired lens when a diluent is used include centrifugal casting and cast molding, for example using molds described in U.S. Pat. No. 4,565,348, as well as combinations of these methods with the other methods described generally herein.

After the lens is prepared, the dye which is dispersed throughout the lens must be bonded or fixed to the hydrophilic polymer composition which forms the lens. This can be done using the conventional technique of contacting the lens with an aqueous base prior to hydration as disclosed, for example, in U.S. Pat. No. 4,891,046. The preferred base is an alkali or alkaline earth metal carbonate, or phosphate, and the required contact time will depend on the contact temperature and the components of the hydrophilic polymer composition.

Advantageously, 0.25 weight percent or less of a surfactant with a hydrophilic/lipophilic balance greater than 10 is added to the aqueous base to enhance the uniformity of the dye dispersion throughout the lens and to improve overall process efficiency. The preferred surfactant for this purpose is Glucam TM MLE-80 ethoxylated glucose sold commercially by Amerchol.

When bonding of the dye to the hydrophilic polymer backbone of the lens is sufficiently complete, the lens can be hydrated to its equilibrium water content. Preferably, the water content of the lens will range from about 35 to about 80 weight percent, more preferably from about 55 to about 65 weight percent. This range is considered ideal for extended wear applications where patient comfort and handling characteristics are critical properties.

The following examples are intended to illustrate the claimed invention and are not in any way designed to limit its scope. Numerous additional embodiments within the scope and spirit of the claimed invention will become apparent to those skilled in the art.

The components used in the preparation of the contact lenses of the examples are abbreviated as follows: 2-hydroxethyl methacrylate (HEMA), methacrylic acid (MAA), ethyleneglycol dimethacrylate (EGDMA), trimethylolpropane trimethacrylate (TMPTMA), boric acid ester of glycerin (0.16 moles boron per mole of glycerin) (GBAE), an ethoxylated methylglucosidelaurate (MLE-80), Reactive Blue #4 [2-anthracenesulfonic acid, 1-amino-4-(3-(4,6-dichloro-s-triazin-2-yl)amino)-4-sulfoanilino)-9,10-dihydro-9,10-dioxo] (RB4) which is a dichlorotriazine dye, and $\alpha$-hydroxy-$\alpha$, $\alpha$-dimethylacetophenone (Darocur 1173) which is a UV reactive initiator. The HEMA used in all of the examples is highly purified HEMA with less than 0.1 wt % impurities.

The test methods for determining the physical and optical properties set forth in the Tables of the examples are as follows:

OXYGEN PERMEABILITY

The oxygen permeability through the lens is expressed as the Dk value multiplied by $10^{-11}$, in units of cm·ml $O_2$/sec·ml·mm Hg. It is measured using a polagraphic oxygen sensor consisting of a 4 mm diameter gold cathode and silver-silver chloride ring anode.

TENSILE PROPERTIES (MODULUS, ELONGATION AND STRENGTH)

The lens to be tested is cut to the desired specimen size and shape and the cross-sectional area measured. The specimen is then attached into the upper grip of a constant rate-of-crosshead-movement type of testing machine equipped with a load cell. The crosshead is lowered to the initial gauge length and the specimen attached to the fixed grip. The specimen is then elongated at a constant rate of strain and the resulting stress-strain curve is recorded. The elongation is expressed in percent and the tensile modulus and strength is expressed in psi (pounds per square inch).

UV TRANSMISSION

This method is applicable to the determination of light transmission through the lens. A beam of light (200–800 nm) is passed through a quartz cell containing the lens in solution. The intensity of light exiting the cell is measured and ratioed against the incident (reference) beam. The values are express in % transmission.

TINT STABILITY

The lens is sterilized in an autoclave for 30 mins and qualitatively compared to a non-autoclaved lens for loss of tint intensity. This procedure is repeated 5 times and a lens which does not lose tint intensity passes the test.

EXAMPLE 1

PREPARATION OF TINTED CONTACT LENS WITH HIGH WATER CONTENT

The following components are mixed to form a homogeneous blend: 46.42 parts HEMA, 0.38 parts EGDMA, 0.05 parts TMPTMA, 0.14 parts Darocur 1173, 0.96 parts MAA, 0.05 parts RB4 [2-anthracenesulfonic acid, 1-amino-4-(3-((4,6-dichloro-s-triazin-2-yl)amino)-4-sulfoanilino)-9,10-dihydro-9,10-dioxo] and 52 parts GBAE. The above blend is polymerized by exposure to UV light while being contained in a contact lens mold. The mold is opened after the polymerization is complete and the molded lens is immersed in an aqueous basic solution containing 1.00 percent $K_2CO_3$, 1.00 percent NaCl, and 0.50 percent MLE-80 at room temperature. The physical and optical properties of this tinted lens are shown in Table 1.

For comparison purposes, the physical and optical properties of an untinted lens, and a lens tinted using the conventional method described in the Background of the Invention, are shown in Table 1 as Comparative Examples A and B, respectively. The untinted lens is prepared substantially identically to the method described above, except the dye RB4 is not added to the blend, and MLE-80 is not added to the aqueous base. Likewise, the tinted lens is prepared in a similar manner, except 0.15 wt % of the dye RB4 is added to the aqueous base instead of the blend before polymerization, and the lens is immersed in the aqueous basic solution containing the dye RB4 at 50° C. for thirty minutes.

TABLE 1

PHYSICAL AND OPTICAL PROPERTIES OF TINTED CONTACT LENS WITH HIGH WATER CONTENT

| Properties | Example 1 | Comparative Example A | Comparative Example B |
|---|---|---|---|
| Physical Properties | | | |
| Water Content, % | 60 | 60 | 60 |
| Oxygen Permeability | 29 | 28 | 27 |
| Tensile Modulus, psi | 35 | 34 | 35 |
| Elongation, % | 118 | 130 | 112 |
| Tensile Strength, psi | 34 | 32 | 34 |
| Optical Properties | | | |
| UV Transmission, Minimum % | 85 | 85 | 85 |
| Tint Stability | yes | — | yes |

The results from Table 1 show that the physical and optical properties of a tinted lens with a high water content made according to the present invention are comparable to those of an untinted lens (Comparative Example A) and a tinted lens made according to the prior art method (Comparative Example B). Additionally, the tinted lens of the invention exhibits good tint stability, so the dichlorotriazine dye used for tinting does not migrate within or leach out of the lens.

EXAMPLE 2

PREPARATION OF TINTED CONTACT LENS WITH LOW WATER CONTENT

The following components are mixed to form a homogeneous blend: 59.04 parts HEMA, 0.72 parts EDGMA, 0.14 parts Darocur 1173, 0.06 parts RB4 and 40 parts GBAE. The above blend is polymerized by exposure to UV light while being contained in a contact lens mold. The mold is opened after the polymerization is complete and the molded lens is immersed in an aqueous basic solution containing 1.00 percent K2CO3, 1.00 percent NaCl, and 0.50 percent MLE-80 at room temperature. The physical and optical properties of this tinted lens are shown in Table 2.

For comparison purposes, the physical and optical properties of an untinted lens, and a lens tinted using the conventional method, are shown in Table 2 as Comparative Examples C and D, respectively. The untinted lens is prepared substantially identically to the method described above, except for the following: a) the dye RB4 is not added to the blend, b) 0.96 parts MAA is added to the blend, and c) MLE-80 is not added to the aqueous base. Likewise, the tinted lens is prepared in a similar manner, except 0.15 wt % of the dye RB4 is added to the aqueous base instead of the blend before polymerization, and the lens is immersed in the aqueous basic solution containing the dye RB4 at 50° C. for thirty minutes.

TABLE 2

PHYSICAL AND OPTICAL PROPERTIES OF TINTED CONTACT LENS WITH LOW WATER CONTENT

| Properties | Example 2 | Comparative Example C | Comparative Example D |
|---|---|---|---|
| Physical Properties | | | |
| Water Content, % | 38 | 38 | 38 |
| Oxygen Permeability | 9 | 9 | 9 |
| Tensile Modulus, psi | 68 | 71 | 65 |
| Elongation, % | 201 | 190 | 180 |
| Tensile Strength, psi | 66 | 65 | 66 |
| Optical Properties | | | |
| UV Transmission, Minimum % | 85 | 95 | 85 |
| Tint Stability | yes | — | yes |

The results from Table 2 show that the physical and optical properties of a tinted lens with a low water content made according to the present invention are comparable to those of an untinted lens (Comparative Example C) and a tinted lens made according to the prior art method (Comparative Example D). Additionally, the tinted lens of the invention exhibits good tint stability, so the dichlorotriazine dye used for tinting does not migrate within or leach out of the lens.

We claim:

1. An improved process for producing a soft, hydrogel contact lens having a dye dispersed substantially uniformly throughout the lens, which process comprises the steps of:
   (a) polymerizing a mixture comprising (i) a homogeneous solution of a hydrophilic monomer including a hydroxyalkyl acrylate or methacrylate and (ii) a water-soluble mono- or dihalotriazine dye, in an inert diluent, to form a lens-shaped polymer swollen with said diluent, said lens-shaped polymer containing hydroxyalkyl groups;
   (b) immersing the product of step (a) in aqueous alkali containing a surfactant to replace said diluent with water and to react said water-soluble mono- or dihalotriazine dye with the said hydroxyalkyl groups, said surfactant being present in an amount effective to enhance the uniformity of the dye throughout the lens-shaped polymer, and said surfactant having a hydrophilic/lipophilic balance greater than 10 and being present in an amount less than 0.25 weight percent based on the total weight of the lens-shaped polymer swollen.

2. The method of claim 1 wherein the mono- or dihalotriazine dye is a dihalotriazine dye.

3. The method of claim 2 wherein the dihalotriazine dye is a dichlorotriazine dye.

4. The method of claim 3 wherein the dichlorotriazine dye is 2-anthracenesulfonic acid, 1-amino-4-(3-((4,6-dichloro-s-triazin-2-yl)amino)-4-sulfoanilino)-9,10-dihydro-9,10-dioxo.

5. The method of claim 3 wherein the dichlorotriazine dye is the disodium salt of 2-anthracenesulfonic acid, 1-amino-4-(3-((4,6-dichloro-s-triazin-2-yl)amino)-4-sulfoanilino)-9,10-dihydro-9,10-dioxo.

6. The method of claim 2 wherein the monohalotriazine dye is a monochlorotriazine dye.

7. The method of claim 6 wherein the monochlorotriazine dye is 2-anthracenesulfonic acid, 1-amino-4-[[4-[[4-chloro-6-[[3(or 4)-sulfophenyl]amino]-1,3,5-triazin-2-yl]amino]-3-sulfophenyl]amino]-9,10-dihydro-9,10-dioxo.

8. The method of claim 1 wherein the amount of dye in the homogeneous solution is between about 0.01 to about 0.50 percent of the weight of the hydrophilic monomer.

9. The method of claim 8 wherein the amount of dye in the homogeneous solution is between about 0.02 to about 0.08 percent of the weight of the hydrophilic monomer.

10. The method of claim 1 wherein the hydrophilic monomer is an hydroxy ester of acrylic or methacrylic acid.

11. The method of claim 10 wherein the hydroxy ester is hydroxyethyl methacrylate.

12. The method of claim 11 wherein the said mixture includes hydroxyethyl methacrylate and methacrylic acid.

13. The method of claim 12 wherein the said mixture includes hydroxyethyl methacrylate, methacrylic acid and ethylene glycol dimethacrylate.

14. The method of claim 13 wherein said mixture includes hydroxyethyl methacrylate, methacrylic acid, ethylene glycol dimethacrylate and trimethylolpropane trimethacrylate.

* * * * *